US012660807B1

(12) United States Patent
White

(10) Patent No.: US 12,660,807 B1
(45) Date of Patent: Jun. 23, 2026

(54) BREAKDOWN COLLAPSIBLE MOUSETRAP WITH ROTATING VANES

(71) Applicant: Jesse Jonah White, Hardin, IL (US)

(72) Inventor: Jesse Jonah White, Hardin, IL (US)

(*) Notice: Subject to any disclaimer, the term of this patent is extended or adjusted under 35 U.S.C. 154(b) by 0 days.

(21) Appl. No.: 19/034,023

(22) Filed: Jan. 22, 2025

(51) Int. Cl.
*A01M 23/04* (2006.01)

(52) U.S. Cl.
CPC ................................... *A01M 23/04* (2013.01)

(58) Field of Classification Search
CPC ...... A01M 23/04; A01M 23/00; A01M 23/02; A01M 23/06; E04B 9/064; F16B 21/08
USPC .......................... 43/71, 69; 285/921; 403/319
See application file for complete search history.

(56) References Cited

U.S. PATENT DOCUMENTS

| | | | | |
|---|---|---|---|---|
| 911,645 A | * | 2/1909 | Christian | .................. F16B 7/20 403/319 |
| 1,636,745 A | * | 7/1927 | Johnson | ................ A01M 23/18 43/69 |
| 2,825,995 A | | 3/1958 | Snider | |
| 4,662,101 A | | 5/1987 | Fisher | |
| 5,996,274 A | | 12/1999 | Smith | |
| 7,627,981 B1 | | 12/2009 | Doster et al. | |
| 9,972,227 B2 | * | 5/2018 | Evans | ........................ G09F 7/22 |
| 11,166,448 B2 | | 11/2021 | Matzen | |
| 11,758,898 B1 | * | 9/2023 | Shoemaker, Jr. | ..... A01M 23/04 43/69 |

| | | | | |
|---|---|---|---|---|
| 2001/0010778 A1 | * | 8/2001 | Hilton | ..................... F16B 21/08 403/321 |
| 2018/0184641 A1 | * | 7/2018 | Moga | .................... A01M 23/02 |
| 2019/0059353 A1 | * | 2/2019 | Matzen | ............... A01M 31/008 |

FOREIGN PATENT DOCUMENTS

| | | | | |
|---|---|---|---|---|
| CN | 118556667 A | * | 8/2024 | ............ A01M 23/04 |

OTHER PUBLICATIONS

Unmasking Macall's Mouse Traps [online]. David C. Drummond; Proceedings of the Fifteenth Vertebrate Pest Conference, Mar. 1992. Retrieved from the Internet: <URL: https://digitalcommons.unl.edu/cgi/viewcontent.cgi?article=1022&context=vpc15>.
Mascall Mill Mouse Trap [online]. ElectroMiro, 2022. Retrieved from the Internet: <URL: www.etsy.com/listing/1292032176/mascall-mill-mouse-trap>.

* cited by examiner

*Primary Examiner* — Zoe Tam Tran
(74) *Attorney, Agent, or Firm* — Carmody MacDonald P.C.; Dennis JM Donahue, III; Kevin C. Staed

(57) ABSTRACT

A mousetrap has a shaft connected to a clip. The shaft has a cylindrical rod with a flange at its proximal end and a cantilever snap-fit stop at its distal end. A pair of tubes are rotatably held on the cylindrical rod in a longitudinally spaced arrangement between the snap-fit stop and the flange. Each of the tubes has a mating sidewall that intermeshes with the other which causes the tubes to rotate in unison on the shaft. A pair of vanes are attached to and laterally extend outward from opposite sides of each one of the tubes in a plane. The planes for the pairs of vanes are perpendicular to each other.

28 Claims, 3 Drawing Sheets

BREAKDOWN COLLAPSIBLE MOUSETRAP WITH ROTATING VANES

CROSS-REFERENCE TO RELATED APPLICATIONS

This application is an original filing of the invention as a non-provisional utility patent application and does not claim a right of priority to any other application or the benefit of an earlier filing date.

BACKGROUND OF THE INVENTION

Field of the Invention

The present invention relates to mousetraps, and more particularly to an improved mousetrap that is used with a bucket.

Related Art

There have been numerous variations of mousetraps that are based on Leonard Mascall's mill mousetrap which is a multi-catch pitfall mousetrap. Generally, Mascall's mill mousetrap has a shaft with a tube that rotates on the shaft and vanes that extend laterally outward from the tube. The shaft is mounted to the sidewall of a container, and bait is placed on the vanes. When a mouse reaches out on the tube in an attempt to eat the bait, the mouse causes the tube to rotate on the shaft, and the vane pushes the mouse off the tube and into the container below.

The prior art mousetraps use stops that are separate from the shaft and tube to hold the tube onto the shaft. It would be preferable to provide a more modular mousetrap that doesn't require any separate stop. Accordingly, there remains a need for a more modular mousetrap that is based on Mascall's mill mousetrap.

SUMMARY OF THE INVENTION

In one aspect of the invention, a mousetrap has a tube that rotates on a shaft which has a cantilever snap-fit stop formed on its distal end. A clip holds the shaft to a bucket's sidewall.

In another aspect of the invention, the mousetrap has a proximal tube and a distal tube which each has a mating sidewall that intermesh with each other and cause the tubes to rotate in unison on the shaft.

In yet another aspect of the invention, one pair of vanes laterally extends outward in a plane from opposite sides of the proximal tube and another pair of vanes laterally extends outward in another plane from opposite sides of each of the distal tube, and the proximal tube's vanes are spaced closer to the clip than the distal tube's vanes.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
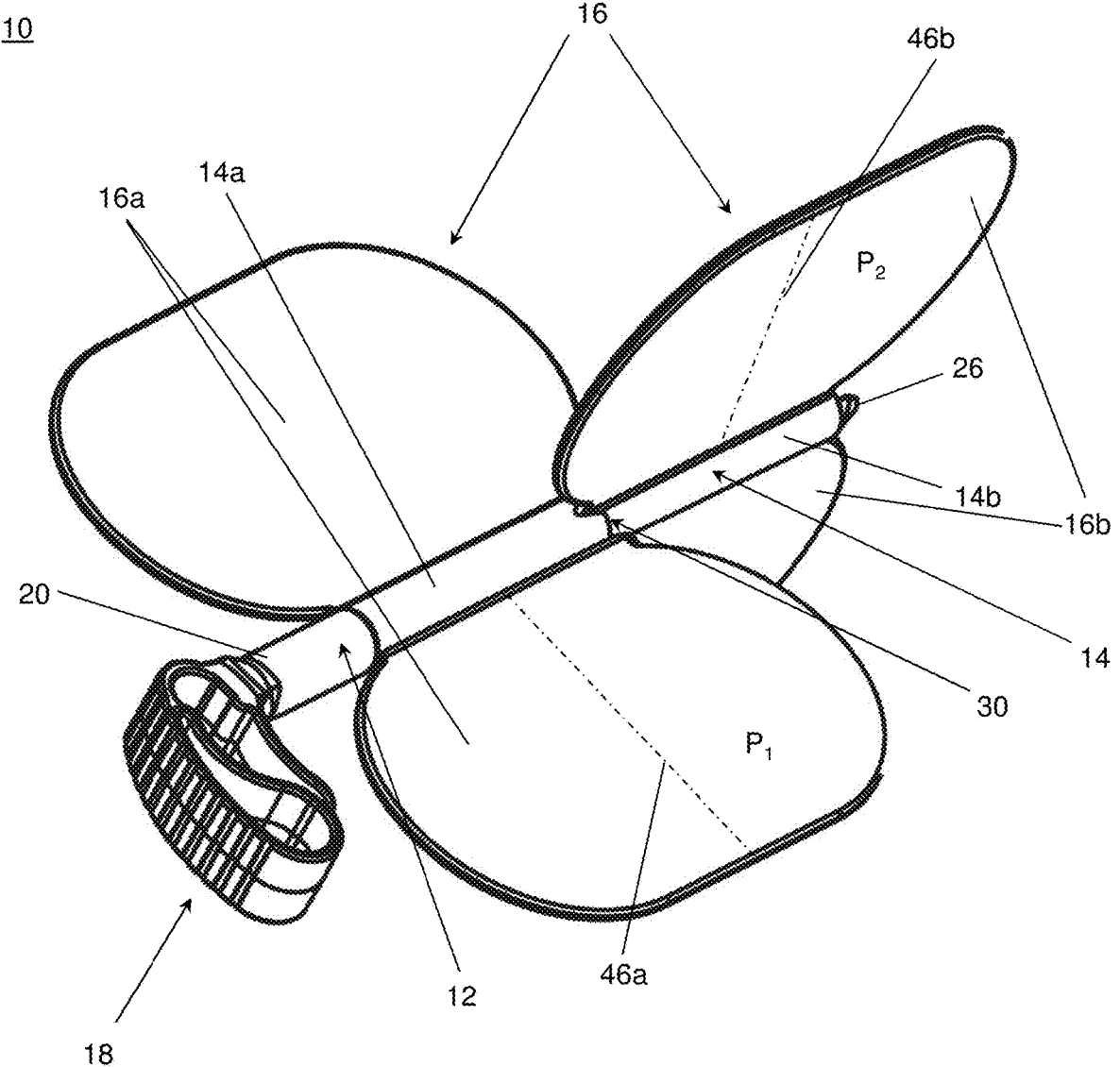
FIG. 1 is a perspective view of the assembled mousetrap device according to the present invention.

The following description of the preferred embodiment(s) is merely exemplary in nature and is in no way intended to limit the invention, its application, or uses.

The mousetrap 10 of the present invention is used in combination with a bucket 100 to allow for multiple catches without any need to reset the trap. The mousetrap has a shaft 12, a tube 14 that rotates on the shaft, and vanes 16 that are connected to and extend laterally outward from the tube. A clip 18, clamp, or other type of bracket is connected to one end of the shaft through an arm 20. The clip and arm are preferably formed with the shaft, although it will be appreciated that the clip and arm could be formed separately from the shaft and connected to the shaft with fasteners. The clip mounts onto the sidewall 102 of the bucket, and the shaft is cantilevered over the bucket's open top. The clip can have gripping portion that extends over and contacts the exterior side of the sidewall with a friction fit and a curved clamping portion that contacts the interior side of the sidewall with a friction fit.

The shaft includes a cylindrical rod 22, a flange 24, and a terminal stop 26. The cylindrical rod has a rod diameter ($D_R$) and longitudinally extends a rod length ($L_R$) from a proximal end 28$a$ to a distal end 28$b$. The flange is located adjacent to the proximal end of the cylindrical rod and extends laterally outward from the cylindrical rod to a lateral width ($F_W$) that is greater than the rod diameter ($F_W{>}D_R$). The present invention can have a single, long tube that rotates on the shaft, but in the preferred embodiment, the tube is preferably formed with multiple tube sections. Regardless of whether the mousetrap uses the single tube or multiple tube sections, the tube has an internal diameter ($T_{ID}$) that is greater than the rod diameter and is less than the flange's lateral width ($F_W{>}T_{ID}{>}D_R$). The terminal stop is located adjacent to the distal end of the cylindrical rod and extends laterally outward from the cylindrical rod beyond the internal diameter which prevents the tube from sliding off the distal end of the cylindrical rod. The terminal stop is preferably a cantilever snap-fit stop 26' and, as described in detail below, prevents the distal tube from sliding off the distal end of the cylindrical rod.

In the embodiment shown in the drawings, a proximal tube 14$a$ surrounds a proximal portion 22$a$ of the cylindrical rod, and a distal tube 14$b$ surrounding a distal portion of the cylindrical rod 22$b$. The proximal tube extends from the proximal end of the cylindrical rod toward the distal end by a first tube length ($T_{L1}$), and the distal tube extends from the distal end of the cylindrical rod toward the proximal end by a second tube length ($T_{L2}$). The first tube length and the second tube length are each less than the rod length ($T_{L1}{<}L_R$, $T_{L2}{<}L_R$). As explained in more detail below, the proximal tube and the distal tube each have a mating sidewall 30 that intermesh with each other so that the proximal tube and distal tube engage and rotate with each other relative to the shaft.

Figure 2:
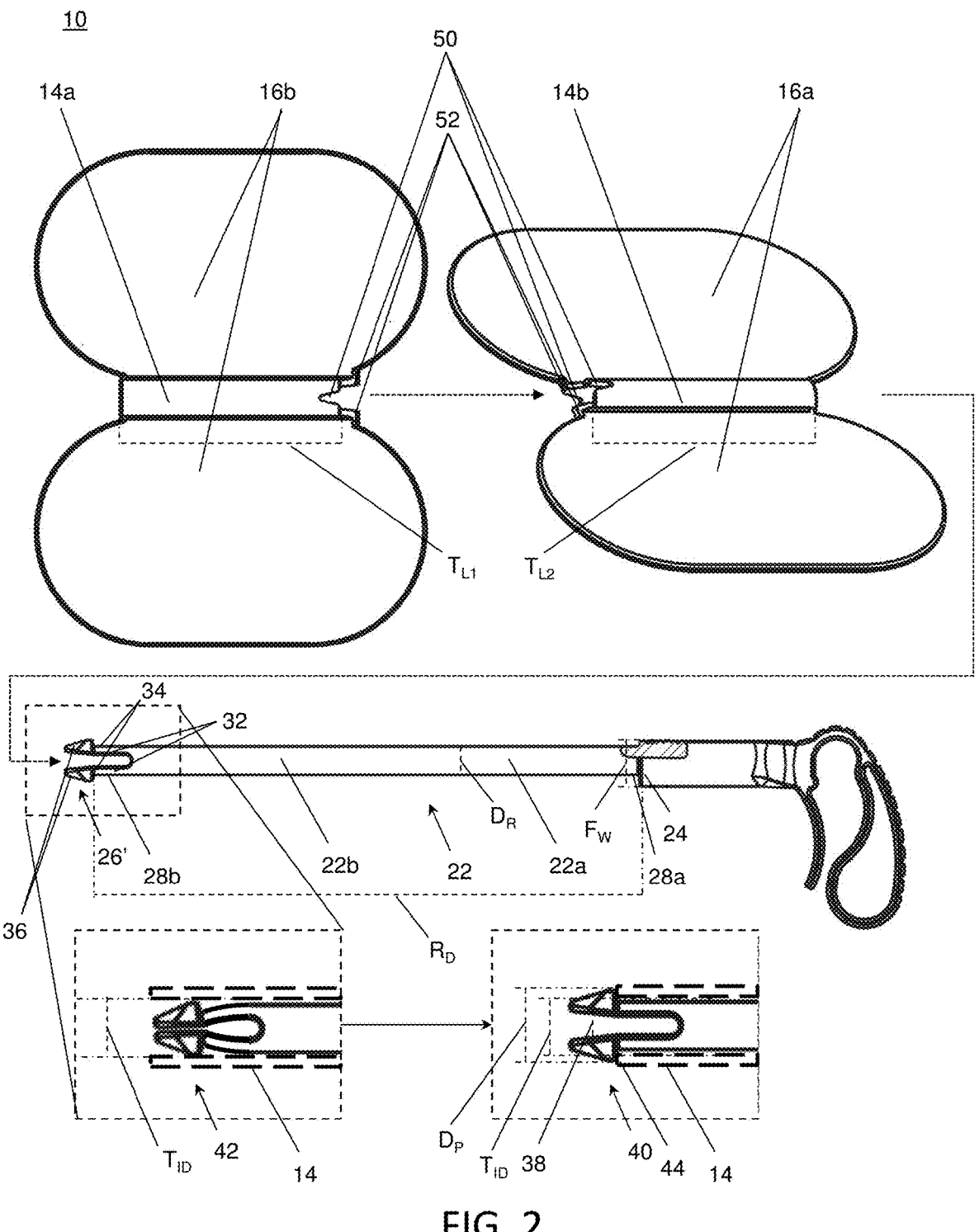
FIG. 2 is an exploded view of the disassembled mousetrap device shown in FIG. 1 with detail views of the cantilever snap-fit in its freeing position and in its locking position.
Figure 3:
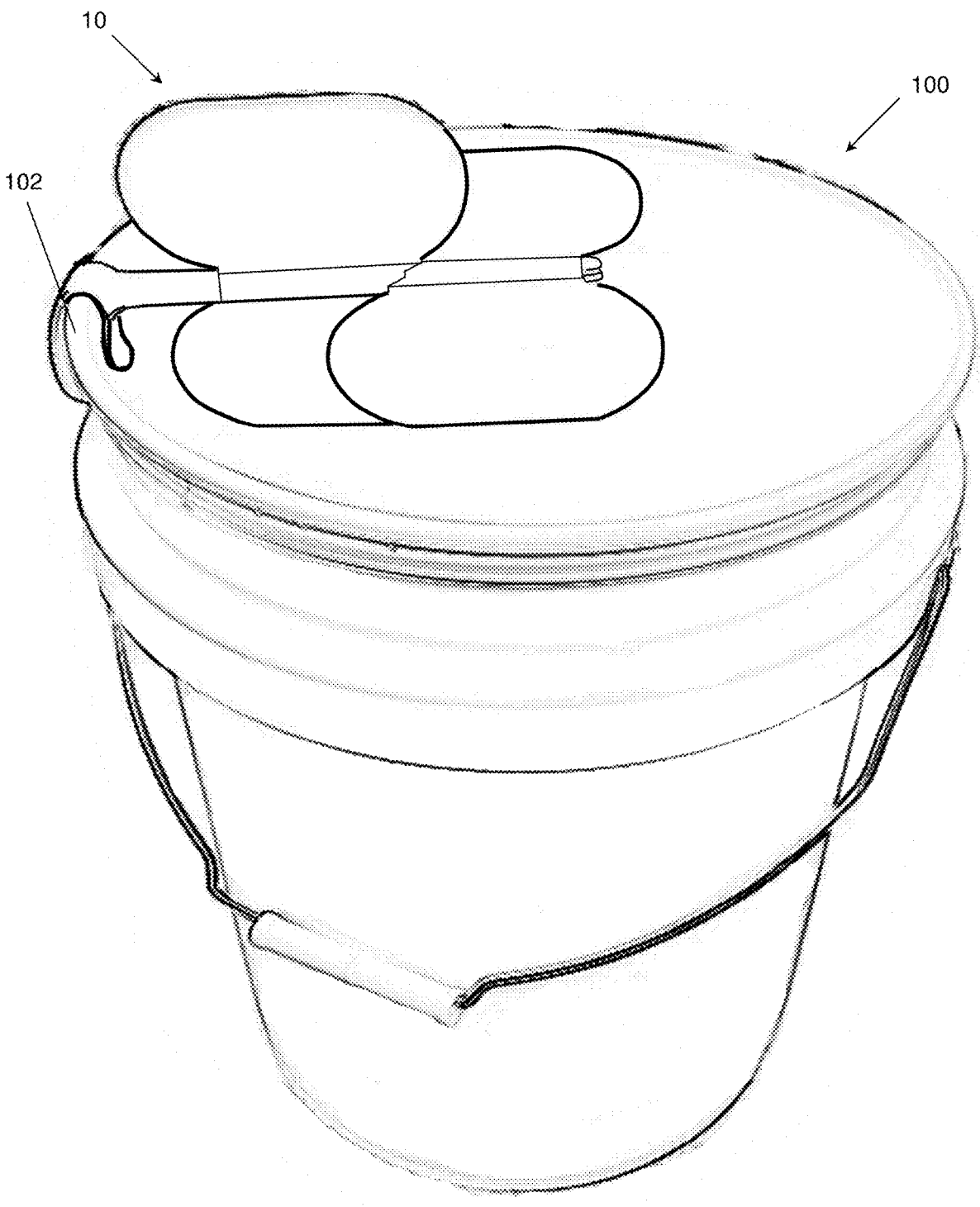
FIG. 3 is a perspective view of the assembled mousetrap device shown in FIG. 1 as it is mounted on a bucket.

The terminal stop is located adjacent to the distal end of the cylindrical rod and extends laterally outward from the cylindrical rod beyond the internal tube diameter at the distal end of the tube. In particular, the cantilever snap-fit stop has a pair of shanks 32 that connect to and extend longitudinally from opposite sides of the distal end of the cylindrical rod to a corresponding pair of free ends 34. A pair of prongs 36 are connected to and extend laterally outward from the free ends of the shanks. As particularly shown in FIG. 2, the prongs are biased apart from each other with a space 38 therebetween in a locking position 40 and are forced toward each other into the space in a freeing position 42. In the locking position, the pair of prongs are spaced apart from each other by a distance ($D_P$) which is greater than the tube's internal diameter, so the prongs extend laterally past the tube's internal diameter and engage a sidewall 44 of the distal tube. In the freeing position, the pair of prongs fit within the tube's internal diameter which allows the tube to slide off the shaft.

It will be appreciated that the terminal stop could be formed by different types of fasteners rather than the cantilever snap-fit stop. For example, the distal end of the rod could have a bore with internal threads which could receive a bolt or a screw with a head that extends laterally past the tube's internal diameter. Similarly, the distal end of the rod could have external threads which could receive a cap nut. Alternatively, the terminal stop could be a pin, zip tie, or other structure that extends through the distal end of the rod, or it could be a compression snap ring connected to the distal end of the rod. In many prior art mousetraps based on Mascall's mill mousetrap, there is only a single tube that holds the vanes, and it slides onto the shaft from the proximal end of the shaft. In this prior art configuration, the terminal stop can be permanently attached to or formed as a part of the distal end of the shaft, and the proximal end of the shaft is connected to the clip or other bracket after the tube slides onto the shaft. In comparison, with the cantilever snap-fit stop of the present invention, the tube can slide over the cantilever snap-fit stop's prongs and onto the cylindrical rod when the prongs are in their freeing position. Accordingly, it will be appreciated that the cantilever snap-fit stop of the present invention can be incorporated into prior art mousetraps that are based on Mascall's mill mousetrap. For example, in U.S. Pat. No. 7,627,981 which has a rotating tube with vanes and is incorporated by reference, rather than using a cantilevered shaft with a stop at its distal end, both ends of the shaft are mounted on opposite sides of the bucket. In the '981 patent, as in other rotating body mousetraps, such as U.S. Pat. No. 5,996,274 which is also incorporated by reference, a bracket could hold the proximal end of the shaft which is cantilevered over the bucket and which has the cantilever snap-fit stop at its distal end.

Unlike prior mousetraps based on the Mascall's mill mousetrap, a pair of vanes are preferably attached to each of the tubes that abut each other and which longitudinally spaces the pairs of vanes from each other. In particular, a proximal pair of vanes 16a extends from opposite sides of the proximal tube 14a in one plane ($P_1$) while a distal pair of vanes 16b extends from opposite sides of the distal tube 14b in another plane ($P_2$). With this configuration, the lateral centerline 46a through the proximal pair of vanes is spaced a closer distance ($V_{D1}$) from the flange than the distance ($V_{D2}$) of the lateral centerline 46b through the distal pair of vanes. As indicated above, although the vanes could be separately connected to a single tube in this longitudinally spaced manner, the vanes are preferably attached to the longitudinally spaced tubes and are oriented in planes that are perpendicular to each other. The vanes are preferably equally spaced around the cylindrical rod so if there are more than two (2) pairs of vanes, the angle between the planes ($P_a$) would be determined according to the number (N) of vanes ($P_a=360/2*N$). It will be appreciated that the vanes could be removably connected to the tube, and in such an embodiment, the lateral centerline for all of the vanes could be located at the same distance from the flange.

With two (2) tubes rotating on the shaft, there must be a connection between the tubes to ensure that they rotate in unison with each other around the shaft. Although fasteners could connect the tubes to each other, the modular design of the present invention preferably uses mating sidewalls which intermesh with each other and do not require any separate fasteners. In particular, each one of the mating sidewalls has a pair of notches 50 that are longitudinally recessed into one pair of opposite sides of the tubular sidewall and a pair of tabs 52 positioned between the pair of notches that longitudinally extend out from another pair of opposite sides of the tubular sidewall. The tabs in the proximal tube extend into the notches in the distal tube, and the tabs in the distal tube extend into the notches in the proximal tube.

The parts of the mousetrap are preferably modular to allow for quick assembly and disassembly. In the disassembled state, the tubes are separate from the shaft and from each other, i.e., their mating sidewalls do not intermesh with each other. With the vanes fixedly attached to the tubes, when the tubes are removed from the shaft, they can be placed in a planar, compact arrangement which allows for efficient transportation and storage of the mousetrap. The present invention provides a multi-catch pitfall mousetrap which is collapsible, allowing it to have a compact arrangement when it is not in use for efficient transportation and storage in a drawer or other container and which also makes it less expensive to ship. Food, water, and tree leaves can be placed in the bucket to reduce the stress of the captured mice that fall into the container. Accordingly, the present invention is a live capture compact and inexpensive trap which is a humane, competitive option to inhumane glue traps and kill traps that are also compact and inexpensive to ship.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. For example, the vanes can have different shapes, rounded, squared off, angular, etc. Thus, the breadth and scope of the present invention should not be limited by any of the above-described exemplary embodiments, but should be defined only in accordance with the following claims appended hereto and their equivalents.

What is claimed is:

1. A mousetrap for use with a bucket, comprising:

a shaft, wherein the shaft comprises a cylindrical rod and a flange, wherein the cylindrical rod has a rod diameter and longitudinally extends a rod length from a proximal end to a distal end, wherein the flange is located adjacent to the proximal end of the cylindrical rod and extends laterally outward from the cylindrical rod, and wherein the flange has a lateral width greater than the rod diameter;

a proximal tube surrounding a first portion of the cylindrical rod, wherein the proximal tube extends from the proximal end of the cylindrical rod toward the distal end by a first tube length, wherein the first tube length is less than the rod length, wherein the proximal tube has a first internal diameter greater than the rod diameter and less than the lateral width of the flange, and wherein the proximal tube rotates relative to the shaft;

a distal tube surrounding a second portion of the cylindrical rod, wherein the distal tube extends from the distal end of the cylindrical rod toward the proximal end by a second tube length, wherein the second tube length is less than the rod length, wherein the distal tube has a second internal diameter greater than the rod diameter and less than the lateral width of the flange, and wherein the proximal tube engages and rotates with the distal tube relative to the shaft;

a first pair of vanes connected to the proximal tube, wherein a first lateral centerline through the first pair of vanes is spaced a first distance from the flange; and a second pair of vanes connected to the distal tube, wherein a second lateral centerline through the second pair of vanes is spaced a second distance from the flange, and wherein the second distance is greater than the first distance.

2. The mousetrap of claim 1, wherein the shaft further comprises a terminal stop located adjacent to the distal end of the cylindrical rod, wherein the terminal stop extends laterally outward from the cylindrical rod beyond the second internal diameter of the distal tube and prevents the distal tube from sliding off the distal end of the cylindrical rod.

3. The mousetrap of claim 2, wherein the terminal stop is comprised of a cantilever snap-fit stop, wherein the cantilever snap-fit stop comprises a pair of shanks and a pair of prongs, wherein the pair of shanks connect to and extend longitudinally from opposite sides of the distal end of the cylindrical rod to a corresponding pair of free ends, and wherein the pair of prongs are connected to and extend laterally outward from the free ends of the shanks.

4. The mousetrap of claim 3, wherein the pair of prongs are biased apart from each other with a space therebetween in a locking position, wherein the pair of prongs extend laterally past the second internal diameter of the distal tube and are spaced from each other by a distance greater than the second internal diameter and engage a sidewall of the distal tube in the locking position, wherein the pair of prongs are forced toward each other into the space in a freeing position, and wherein the pair of prongs fit within the second internal diameter of the distal tube in the freeing position.

5. The mousetrap of claim 1, wherein the first pair of vanes are fixedly attached to and extend laterally outward from opposite sides of the proximal tube in a first plane, and wherein the second pair of vanes are fixedly attached to and extend laterally outward from opposite sides of the distal tube in a second plane, and wherein the second plane is perpendicular to the first plane.

6. The mousetrap of claim 1, further comprising a clip fixedly connected to the shaft proximate to the flange.

7. The mousetrap of claim 6, further comprising an arm attaching the clip to the shaft.

8. The mousetrap of claim 1, wherein the proximal tube and the distal tube each comprise a mating sidewall, and wherein the mating sidewall of the proximal tube intermeshes with the mating sidewall of the distal tube.

9. The mousetrap of claim 8, wherein the mating sidewall is comprised of a pair of notches longitudinally recessed into a first pair of opposite sides of the tubular sidewall and a pair of tabs positioned between the pair of notches and longitudinally extending out from a second pair of opposite sides of the tubular sidewall, wherein the pair of tabs in the proximal tube extend into the pair of notches in the distal tube, and wherein the pair of tabs in the distal tube extend into the pair of notches in the proximal tube.

10. A mousetrap for use with a bucket, comprising:

a shaft, wherein the shaft comprises a cylindrical rod, a flange, and a cantilever snap-fit stop, wherein the cylindrical rod has a rod diameter and longitudinally extends a rod length from a proximal end to a distal end, wherein the flange is located adjacent to the proximal end of the cylindrical rod and extends laterally outward from the cylindrical rod, wherein the flange has a lateral width greater than the rod diameter, wherein the cantilever snap-fit stop comprises a pair of shanks and a pair of prongs, wherein the pair of shanks connect to and extend longitudinally from opposite sides of the distal end of the cylindrical rod to a corresponding pair of free ends, and wherein the pair of prongs are connected to and extend laterally outward from the free ends of the shanks;

a first tube surrounding a first portion of the cylindrical rod, wherein the first tube has a first internal diameter greater than the rod diameter and less than the lateral width of the flange, and wherein the first tube rotates relative to the shaft; and a first set of vanes connected to and extending laterally outward from the first tube.

11. The mousetrap of claim 10, wherein the pair of prongs are biased apart from each other with a space therebetween in a locking position, wherein the pair of prongs extend laterally past the first internal diameter of the first tube and are spaced from each other by a distance greater than the first internal diameter and engage a sidewall of the first tube in the locking position, wherein the pair of prongs are forced toward each other into the space in a freeing position, and wherein the pair of prongs fit within the first internal diameter of the first tube in the freeing position.

12. The mousetrap of claim 10, further comprising a second tube and a second set of vanes, wherein the second tube surrounds a second portion of the cylindrical rod and has a second internal diameter greater than the rod diameter and less than the lateral width of the flange, wherein the second tube rotates relative to the shaft, wherein the second set of vanes are connected to and extend laterally outward from the second tube, wherein the first set of vanes are in a first plane, and wherein the second set of vanes are in a second plane perpendicular to the first plane.

13. The mousetrap of claim 12, wherein the first tube and the second tube each comprise a mating sidewall comprised of a pair of notches longitudinally extending into the sidewall and a pair of tabs longitudinally extending out from the sidewall, wherein the pair of tabs in the mating sidewall of the first tube extend into the pair of notches in the mating sidewall of the second tube, and wherein the pair of tabs in the mating sidewall of the second tube extend into the pair of notches in the mating sidewall of the first tube.

14. The mousetrap of claim 12, wherein a first lateral centerline through the first set of vanes is spaced a first distance from the flange, wherein a second lateral centerline through the second set of vanes is spaced a second distance from the flange, and wherein the first distance is greater than the second distance.

15. A mousetrap for use with a bucket, comprising:

a shaft, wherein the shaft comprises a cylindrical rod, a flange, and a terminal stop, wherein the cylindrical rod has a rod diameter and longitudinally extends a rod length from a proximal end to a distal end, wherein the flange is located adjacent to the proximal end of the cylindrical rod and extends laterally outward from the cylindrical rod, wherein the flange has a lateral width greater than the rod diameter, and wherein the terminal stop is located adjacent to the distal end of the cylindrical rod;

a clip fixedly attached to the shaft proximate to the flange, wherein the clip connects to the bucket;

a tube surrounding the cylindrical rod, wherein the tube has an internal diameter greater than the rod diameter and less than the lateral width of the flange, and wherein the tube rotates relative to the shaft;

a first pair of vanes connected to and extending laterally outward from the tube, wherein the first pair of vanes are situated in a first plane; and a second pair of vanes connected to and extending laterally outward from the tube, wherein the second pair of vanes are situated in a second plane, and wherein the second plane is perpendicular to the first plane.

16. The mousetrap of claim 15, wherein the tube is comprised of a proximal tube section and a distal tube section, wherein the first pair of vanes are connected to and extend laterally outward from the proximal tube section, wherein a first lateral centerline through the first pair of vanes is spaced a first distance from the flange, wherein the second pair of vanes are connected to and extend laterally outward from the distal tube section, wherein a second lateral centerline through the second pair of vanes is spaced a second distance from the flange, and wherein the second distance is greater than the first distance.

17. The mousetrap of claim 16, wherein the proximal tube section and the distal tube section each comprise a mating sidewall, wherein the mating sidewall is comprised of a pair of notches longitudinally extending into the sidewall and a pair of tabs positioned between the pair of notches and longitudinally extending out from the sidewall, wherein the pair of tabs in the mating sidewall of the proximal tube section extend into the pair of notches in the mating sidewall of the distal tube section, and wherein the pair of tabs in the mating sidewall of the distal tube section extend into the pair of notches in the mating sidewall of the proximal tube section.

18. The mousetrap of claim 15, wherein the terminal stop is a cantilever snap-fit stop, wherein the cantilever snap-fit stop comprises a pair of shanks and a pair of prongs, wherein the pair of shanks connect to and extend longitudinally from opposite sides of the distal end of the cylindrical rod to a corresponding pair of free ends, and wherein the pair of prongs are connected to and extend laterally outward from the free ends of the shanks.

19. The mousetrap of claim 18, wherein the pair of prongs are biased apart from each other with a space therebetween in a locking position, wherein the pair of prongs extend laterally past the internal diameter of the tube and are spaced from each other by a distance greater than the internal diameter of the tube and engage a sidewall of the distal tube section in the locking position, wherein the pair of prongs are forced toward each other into the space in a freeing position, and wherein the pair of prongs fit within the internal diameter of the tube in the freeing position.

20. A mousetrap for use with a bucket, comprising:

a shaft, wherein the shaft comprises a cylindrical rod and a flange, wherein the cylindrical rod has a rod diameter and longitudinally extends a rod length from a proximal end to a distal end, wherein the flange is located adjacent to the proximal end of the cylindrical rod and extends laterally outward from the cylindrical rod, and wherein the flange has a lateral width greater than the rod diameter;

a proximal tube surrounding a first portion of the cylindrical rod, wherein the proximal tube extends from the proximal end of the cylindrical rod toward the distal end by a first tube length, wherein the first tube length is less than the rod length, wherein the proximal tube has a first internal diameter greater than the rod diameter and less than the lateral width of the flange, and wherein the proximal tube rotates relative to the shaft;

a distal tube surrounding a second portion of the cylindrical rod, wherein the distal tube extends from the distal end of the cylindrical rod toward the proximal end by a second tube length, wherein the second tube length is less than the rod length, wherein the distal tube has a second internal diameter greater than the rod diameter and less than the lateral width of the flange, and wherein the proximal tube engages and rotates with the distal tube relative to the shaft;

a first pair of vanes connected to the proximal tube; and a second pair of vanes connected to the distal tube, wherein a first lateral centerline through the first pair of vanes is spaced a first distance from the flange, wherein a second lateral centerline through the second pair of vanes is spaced a second distance from the flange, and wherein the second distance is greater than the first distance.

21. A mousetrap for use with a bucket, comprising:

a shaft, wherein the shaft comprises a cylindrical rod and a flange, wherein the cylindrical rod has a rod diameter and longitudinally extends a rod length from a proximal end to a distal end, wherein the flange is located adjacent to the proximal end of the cylindrical rod and extends laterally outward from the cylindrical rod, and wherein the flange has a lateral width greater than the rod diameter;

a proximal tube surrounding a first portion of the cylindrical rod, wherein the proximal tube extends from the proximal end of the cylindrical rod toward the distal end by a first tube length, wherein the first tube length is less than the rod length, wherein the proximal tube has a first internal diameter greater than the rod diameter and less than the lateral width of the flange, and wherein the proximal tube rotates relative to the shaft;

a distal tube surrounding a second portion of the cylindrical rod, wherein the distal tube extends from the distal end of the cylindrical rod toward the proximal end by a second tube length, wherein the second tube length is less than the rod length, wherein the distal tube has a second internal diameter greater than the rod diameter and less than the lateral width of the flange, and wherein the proximal tube engages and rotates with the distal tube relative to the shaft;

a first pair of vanes connected to the proximal tube;

a second pair of vanes connected to the distal tube; and a clip fixedly connected to the shaft proximate to the flange.

22. A mousetrap for use with a bucket, comprising:

a shaft, wherein the shaft comprises a cylindrical rod and a flange, wherein the cylindrical rod has a rod diameter and longitudinally extends a rod length from a proximal end to a distal end, wherein the flange is located adjacent to the proximal end of the cylindrical rod and extends laterally outward from the cylindrical rod, and wherein the flange has a lateral width greater than the rod diameter;

a proximal tube surrounding a first portion of the cylindrical rod, wherein the proximal tube extends from the proximal end of the cylindrical rod toward the distal end by a first tube length and comprises a first mating sidewall, wherein the first tube length is less than the rod length, wherein the proximal tube has a first internal diameter greater than the rod diameter and less than the lateral width of the flange, and wherein the proximal tube rotates relative to the shaft;

a distal tube surrounding a second portion of the cylindrical rod, wherein the distal tube extends from the distal end of the cylindrical rod toward the proximal end by a second tube length and comprises a second mating sidewall, wherein the second tube length is less than the rod length, wherein the distal tube has a second internal diameter greater than the rod diameter and less than the lateral width of the flange, and wherein the first mating sidewall of the proximal tube intermeshes and rotates with the second mating sidewall of the distal tube relative to the shaft;

a first pair of vanes connected to the proximal tube; and a second pair of vanes connected to the distal tube.

23. A mousetrap for use with a bucket, comprising:

a shaft, wherein the shaft comprises a cylindrical rod, a flange, and a terminal stop, wherein the cylindrical rod has a rod diameter and longitudinally extends a rod length from a proximal end to a distal end, wherein the flange is located adjacent to the proximal end of the cylindrical rod and extends laterally outward from the cylindrical rod, wherein the flange has a lateral width greater than the rod diameter, and wherein the terminal stop is located adjacent to the distal end of the cylindrical rod;

a clip fixedly connected to the shaft proximate to the flange;

a tube surrounding the cylindrical rod, wherein the tube has an internal diameter greater than the rod diameter and less than the lateral width of the flange, wherein a first end of the tube is adjacent to the flange, wherein a second end of the tube is adjacent to the terminal stop, wherein the tube has a tube length extending from the first end to the second end, and wherein the tube rotates relative to the shaft; and a plurality of vanes connected to and extending laterally outward from the tube, wherein the plurality of vanes are situated in a plurality of planes, and wherein the planes intersect with the tube along the tube length between the first end and the second end.

24. The mousetrap of claim 23, wherein the tube is comprised of a proximal tube section and a distal tube section, wherein a first one of the vanes is connected to and extends laterally outward from the proximal tube section, wherein a first lateral centerline through the first one of the vanes is spaced a first distance from the flange, wherein the second one of the vanes is connected to and extends laterally outward from the distal tube section, wherein a second lateral centerline through the second one of the vanes is spaced a second distance from the flange, and wherein the second distance is greater than the first distance.

25. The mousetrap of claim 23, wherein the tube is comprised of a proximal tube section and a distal tube section, wherein the proximal tube section and the distal tube section each comprise a mating sidewall, and wherein the mating sidewall of the proximal tube section intermeshes with the mating sidewall of the distal tube section.

26. The mousetrap of claim 25, wherein the plurality of vanes are comprised of a first pair of vanes fixedly attached to and extending laterally outward from the proximal tube section and not connected to the distal tube section, a second pair of vanes fixedly connected to and extending laterally outward from the distal tube section and not connected to the proximal tube section.

27. The mousetrap of claim 23 wherein the terminal stop is comprised of a cantilever snap-fit stop, wherein the cantilever snap-fit stop comprises a pair of shanks and a pair of prongs, wherein the pair of shanks connect to and extend longitudinally from opposite sides of the distal end of the cylindrical rod to a corresponding pair of free ends, and wherein the pair of prongs are connected to and extend laterally outward from the free ends of the shanks.

28. The mousetrap of claim 23, wherein the plurality of vanes are removably connected to the tube.

* * * * *